United States Patent [19]
Schwarzbich

[11] Patent Number: 5,794,479
[45] Date of Patent: Aug. 18, 1998

[54] ADJUSTING MECHANISM

[76] Inventor: Jörg Schwarzbich, Wertherstr. 15, D-33615 Bielefeld, Germany

[21] Appl. No.: 646,074

[22] Filed: May 7, 1996

[30] Foreign Application Priority Data

May 19, 1995 [DE] Germany ............ 195 18 424.6

[51] Int. Cl.$^6$ .................... B60N 2/02; F16D 43/02
[52] U.S. Cl. .................... 74/143; 192/8 R; 192/44
[58] Field of Search ............ 74/142, 143; 192/8 C, 192/7, 44, 8 R; 297/361.1, 362, 374; 81/59.1, 60, 63.1

[56] References Cited

U.S. PATENT DOCUMENTS

| | | |
|---|---|---|
| 2,066,167 | 12/1936 | Swartz . |
| 4,852,707 | 8/1989 | Ito et al. .................... 192/44 |
| 5,103,950 | 4/1992 | Ito et al. .................... 192/44 X |
| 5,248,017 | 9/1993 | Schwarzbich . |
| 5,460,253 | 10/1995 | Ritter et al. .................... 192/8 R |
| 5,522,488 | 6/1996 | Schwarzbich .................... 182/8 R |
| 5,593,210 | 1/1997 | Schwarzbich .................... 297/361.1 |

FOREIGN PATENT DOCUMENTS

| | | |
|---|---|---|
| 0 631 901 | 1/1995 | European Pat. Off. . |
| 604 395 | 10/1934 | Germany . |
| 804 876 | 6/1953 | Germany . |
| 37 34 363 | 4/1989 | Germany . |
| 38 39 732 | 6/1990 | Germany . |

*Primary Examiner*—Charles A. Marmor
*Assistant Examiner*—Troy Grabow
*Attorney, Agent, or Firm*—Burns, Doane, Swecker & Mathis, L.L.P.

[57] ABSTRACT

An adjustable member such as a seat back of a vehicle is connected to an adjustment mechanism which transfers an external mechanical or manual force to the seat back. The adjustment mechanism includes an actuating element which rotates the seat back in either direction in response to the application of the external force. An elastic return element stores energy during such movement to subsequently return the actuating element to a rest position. During such return, the actuating element is automatically disconnected from the seat back.

14 Claims, 3 Drawing Sheets

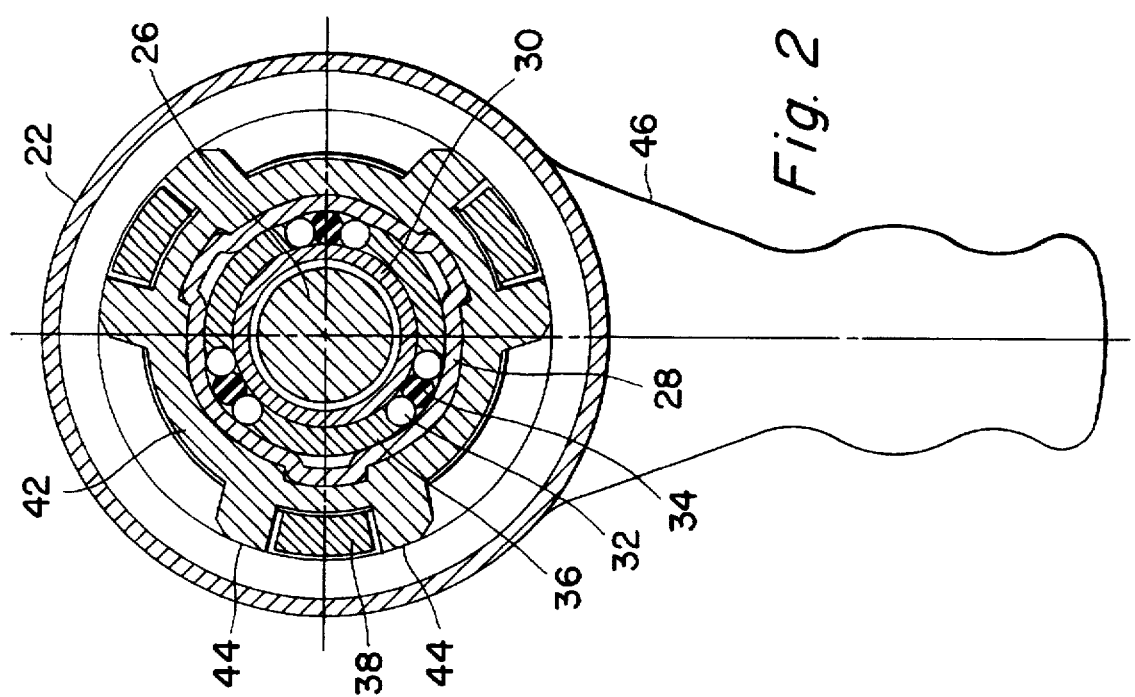
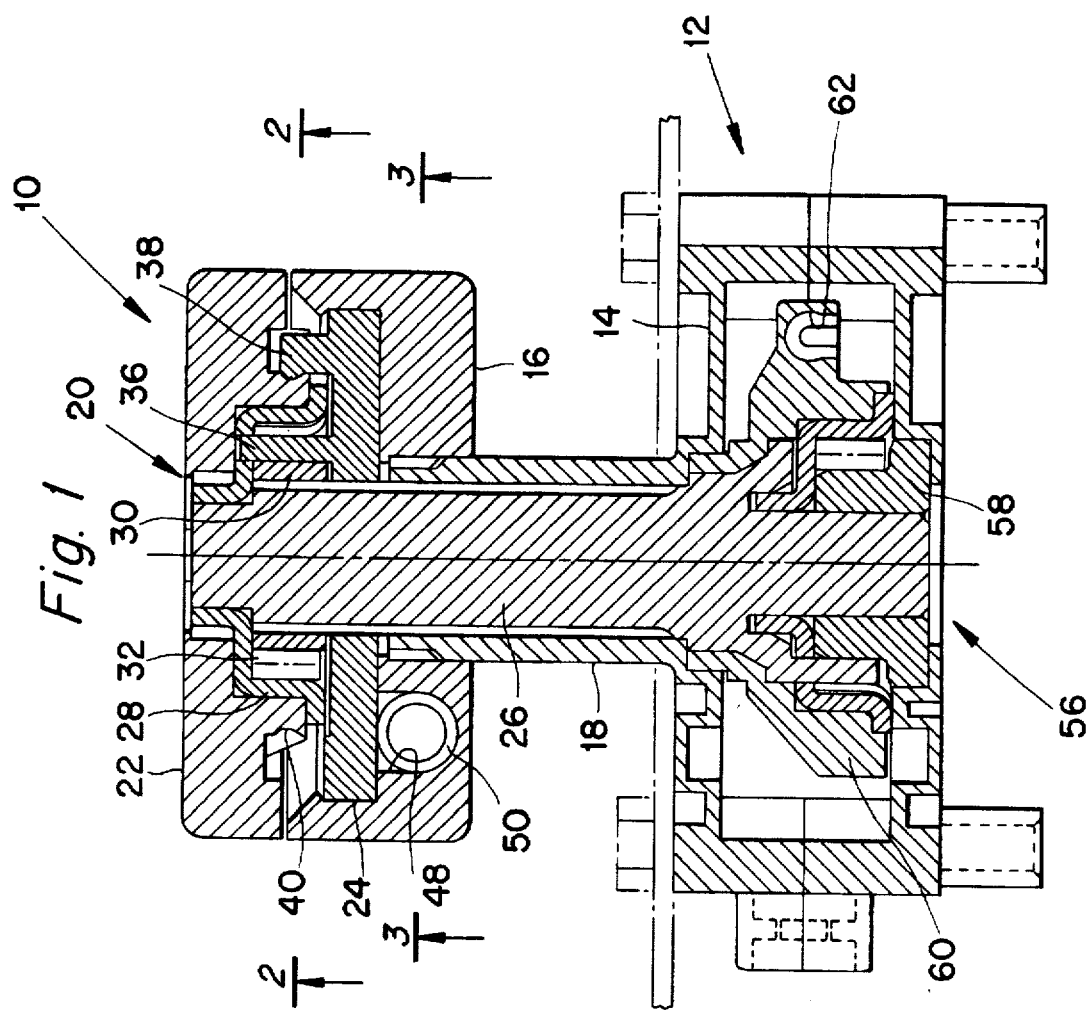

ADJUSTING MECHANISM

BACKGROUND OF THE INVENTION

The object of the invention is an adjusting mechanism, especially for seat adjusters in vehicles, for translating a back and forward movement of an actuating device into an intermittent movement in the same direction of an adjusting device.

A catch locking gear (ratchet) is a typical example of a customary adjusting mechanism of this kind in which a catch engages with the toothing of the adjusting device when the actuating device is moved in one direction while the catch glides over the toothing of the adjusting device during the return movement.

This catch locking gear is disadvantageous in that the catch causes an unpleased "ratchet" noise during the return movement of the actuating device. In certain applications it is also disadvantageous that the catch and the toothing of the adjusting device cannot engage continuously in any position. Above all, such a catch locking gear is disadvantageous in that it allows the adjusting device to be adjusted in one direction only.

If it is to be adjusted in both directions, a very complicated mechanism is required which has two catch locking gears acting in two opposite directions as well as mechanisms for unlocking the respective locking gear which is ineffective at the time.

In order to reduce the noise level it is possible to substitute for the catch locking gear a directionally switched coupling (free-wheel). However, even with the help of such a free-wheel the adjusting device can only be adjusted in a single direction and in this case it is even more complicated than in a catch locking gear to compensate for the catch when the adjusting device is to be moved in two opposite directions.

SUMMARY OF THE INVENTION

The object of the invention is to provide a simple and quiet adjusting mechanism which makes it possible to move the adjusting device selectively in either of two opposite directions by means of the actuating device.

The invention pertains to an adjusting mechanism for adjusting an adjustably movable member, such as the back of a vehicle seat. The adjusting mechanism comprises an adjusting element adapted to be connected to the adjustably movable member for producing an adjustment thereof, and a coupling operably connected to the adjusting element for moving the adjusting element. The coupling element includes an actuating element, a release element, an elastic return element, and a connecting mechanism. The actuating element is arranged for movement in first and second opposite directions in response to the application thereto of an actuating force external to the coupling, such as for example the application of a manual force to an actuating handle element. The release element is operably connected to the actuating element for movement therewith in the first and second directions. The elastic return element is operably connected to the release element for storing energy in response to the release element being driven in either of the first and second directions by the actuating element when acted upon by the actuating force, and for applying the stored energy as a restoring force to the release element for causing the release element to drive the actuating element in a return direction. The connecting mechanism operably connects the coupling to the adjusting element for driving the adjusting element when the actuating element and the release element are driven by the actuating force, and for releasing the coupling from the adjusting element when the actuating element and release element are driven in a return direction by the restoring force.

The actuating element preferably comprises a manually actuable handle for applying a manual force as the external force.

The first and second directions of movement preferably constitute rotational directions about an axis of rotation. The actuating and release elements are both rotatable about the axis of rotation in the first and second directions. The adjusting element comprises a shaft rotatable about the axis of rotation.

One component of the adjusting mechanism in accordance with the invention is a coupling which is connected in a input-dependent manner. Such an input-dependent coupling has an output element and two input elements which are called a catch element and a release element. When a force acts on the catch element in order to move it into one or the other direction then the release element as well as the output element are moved independent of the direction. If, however, the force acts on the release element then only the release element and the catch element together move in the corresponding direction and the driving force is not transferred to the output element.

Schwarzbich U.S. Pat. No. 5,248,017 describes an example of an input dependent coupling per se. Another example of such a coupling is a so-called wrap spring clutch. In this case the output element is enclosed by a wrap spring. The catch element acts on an end of the wrap spring in each direction of rotation in a manner which ensures that the wrap spring encloses the output element even tighter and thus provides the frictional connection with the output element. The release element on the other hand acts in each direction of rotation in the opposite sense on one of the ends of the wrap spring so that the latter releases the output element. In the adjusting mechanism in accordance with the invention the actuating device serves as the catch element and the adjusting device of such a coupling. There also is an elastic readjusting device which acts between the release element of the coupling and a stationary part and which applies a restoring force to the release element when the latter is deflected from its starting position in any direction.

When the actuating device is moved in any direction then the release element and the adjusting device are carried along in this direction since the actuating device is the catch element of the coupling. The movement of the release element stores energy in the readjusting device. When the actuating device is released subsequently, the stored energy is applied to the release element in a readjusting direction via the readjusting device which causes both the release element and the actuating device to return to their starting position while the output element remains in the position it has reached. By "pumping" the actuating device several times the adjusting device can be moved in any direction whereby the adjusting direction is determined by the direction from which the actuating device is deflected from the starting position.

This is how the invention provides a very user-friendly and quiet adjusting mechanism.

BRIEF DESCRIPTION OF THE DRAWING

The objects and advantages of the invention will become apparent from the following detailed description of preferred embodiments thereof in connection with the accompanying drawing, in which like numerals designate like elements, and in which:

FIG. 1 shows a longitudinal section along plane 1—1 in FIG. 3 through an adjusting mechanism in accordance with a first exemplary embodiment;

FIG. 2 shows a section along plane 2—2 in FIG. 1;

DETAILED DESCRIPTION OF PREFERRED EMBODIMENTS OF THE INVENTION

Figure 3:
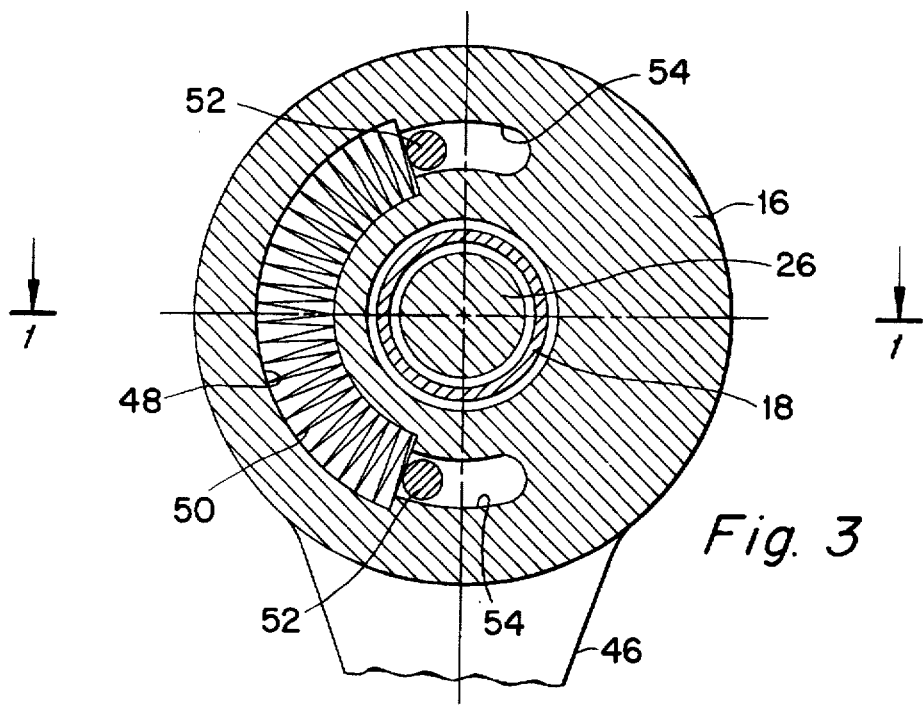
FIG. 3 shows a section along plane 3—3 in FIG. 1.

The adjusting mechanism shown in FIG. 1 is used as a seat adjuster in vehicles and is used, for example, for adjusting an adjustably movable member such as the back of a seat, a lordosis support and others.

The adjusting mechanism is comprised of an actuating unit 10 and a driving unit 12 which is located in a box shaped housing 14. The actuating unit 10 has a stationary part which is comprised of a plate shaped or pot shaped support 16 which rests on the free end of a pipe-shaped extension 18 of the housing 14 and which is wedged torsionally onto it. The actuating unit also is comprised of: (i) an input-dependent coupling 20 with an actuating element or actuating device 22 which acts as a catch element, (ii) a discoid release element 24 which can turn in the support 16, and (iii) an output element in the form of a shaft 26 which extends through the pipe-shaped extension 18 of the housing 14 and into the driving unit 12 and constitutes the adjusting element or adjusting device of the adjusting mechanism.

The structure of the coupling 20 is identical to the one described in U.S. Pat. No. 5,248,017. The actuating device 22, the release element 24 and the shaft 26 are arranged in a co-axial manner. The actuating device 22 holds a metal pot-shaped bearing shell 28 which is open towards the release element 24. FIG. 2 shows that this bearing shell is torsionally engaged with the actuating device 22 by means of projections which point radially outward. The inside of the bearing shell holds a metal ring 30 which is wedged torsionally onto the free end of the shaft 26. The inside surface of the bearing shell 28 and the outside surface of the ring 30 form an annular gap which accommodates three pairs of pinch rolls 32. There is an elastic spacer 34 between each pair of pinch rolls (FIG. 2) and the individual pinch roll pairs are separated by fingers 36 which protrude axially from the release element 24 and engage in corresponding slots of the floor of the bearing shell 28. The inside surface of the bearing shell 28 is bulged a little to the outside where the spacers 34 are located so that the gap between the bearing shell and the ring 30 is wedge shaped towards the fingers 36 in the areas with the pinch rolls 32.

The fingers 36 which engage into the slots in the floor of the bearing shell 28 have some clearance in the circumferential direction in these slots. Outside the fingers 36 the release element 24 has other axially protruding pegs 38 which are latched into negative contours 40 of the actuating device or catch element 22. This means that the actuating device can be removed from the release element 24 which in turn is latched into the support 16.

FIG. 2 shows that each of the pegs 38 is disposed (with play) between two claws 44 which protrude radially from an inside ring 42 of the actuating device 22. This means that the release element 24 and the actuating device 22 rotate relative to each other only within a limited range (i.e. the play) and otherwise can only be rotated together relative to the support 16 and/or the ring 30.

The following paragraphs are to explain briefly the customary principle of the coupling 20. When the actuating device 22 (which is of one piece with a lever 46), is turned clockwise or counter-clockwise then this rotation is transferred to the bearing shell 28. Rotation of the bearing shell relative to the ring 30 is prevented due to the fact that one of the pinch rolls 32 of each pair becomes wedged in the wedge-shaped gap between the bearing shell 28 and the ring 30. This means that the ring 30 as well as the pinch rolls 32 and the spacers 34 are carried along during the rotation process and that the release element 24 is also rotated due to the engagement of the fingers 36 between the pinch rolls 32. This is how the swivelling movement of the lever 46 or the movement of rotation of the actuating device 22 is transferred onto the ring 30 without practically any relative movement and therefore is transferred to the shaft 26.

If, on the other hand, an input torque were to act on the release element 24 instead of on the actuating device 22 (e.g., by means of a spring 50 to be explained), then the fingers 36 press the pinch roll 32 against the force of the elastic spacer 34 and out of the wedge-shaped area of the gap between the ring 30 and the bearing shell 28 so that the pinch rolls do not become wedged. After an initial minor rotation of the release element 24, relative to the actuating device 22, its pegs 38 make contact with the respective claws 44, and then the actuating device 22 is carried along in the direction of rotation while the pinch rolls 32 roll freely upon the outside surface of the ring 30. In this case the ring 30 as well as the shaft 26 do not rotate. If the force is supplied via the release element 24 then the coupling 20 acts as a free-wheel in both directions, i.e. the release element 24 and the actuating device 22 can rotate independent of the shaft 26.

There is a groove 48 in the floor surface of the support 16 which faces the release element 24 of the coupling 20 and which runs in an arc of a circle concentric with the shaft 26, as can be seen in FIG. 3. This groove 48 accommodates a coil spring 50 which is bent accordingly and whose opposite ends rest on the ends of the groove 48 as well as on two pegs 52 which protrude from the release element 24. The ends of the groove 48 are followed by a more narrow groove 54 which runs on the same arc of a circle and in which the respective peg 52 can move.

The spring 50 and the pegs 52 form an elastic readjusting device by means of which the release element 24 can be torqued and turned back into the starting position shown in FIG. 3 after being rotated in one or the other direction relative to the support 16. If, for example, the release element with the peg 52 in FIG. 3 is turned clockwise, then the spring 50 is compressed by the lower peg 52 while the upper end of the spring rests against the end of the groove 48.

The above readjusting device 50, 52 together with the above coupling 20 makes it possible to turn the shaft 26 gradually into each desired direction by pumping the lever 46. When the lever 46 is swivelled from the starting position into one direction, then the force is fed into the coupling 20 via the actuating device 22 which in turn causes the release element 24 and the shaft 26 to rotate in the actuating direction. During this process the spring 50 is compressed. When the lever 46 is subsequently released, the spring 50 exerts a torque on the release element 24 which in turn is rotated back into the starting position together with the actuating device 22 but without the ring 30 and the shaft 26. By repeating this process the shaft 26 can be gradually rotated further. If the shaft 26 is to be rotated in the opposite direction, the lever 46 is swivelled from the starting position in the other direction. The swivelling range of the lever 46 is limited in every direction in that one of the pegs 52 of the release element 24 makes contact with the end of the respective groove 54. By suitably configuring the grooves 48 and 54 and the spring 50, the swivelling range of the lever 46 can be changed.

In the exemplary embodiment shown in FIG. 1, the actuating unit 12 also accommodates another input-dependent coupling 56 whose structure follows the same principle as the one in coupling 20 described above. The lower end of the shaft 26 in FIG. 1 constitutes the release element of this coupling and the counterpart to the ring 30 is comprised of a bearing bush 58 in a stationary housing which simultaneously serves as the bearing for the shaft 26. The catch element 60 of the coupling 56 is an annular body which has a radially protruding receptacle 62 on its outer circumference inside the housing 14 in which the end of a Bowden pull wire can be anchored. This means that the Bowden pull wire can be adjusted in any direction via the coupling 56 and by means of the shaft 26. If, however, a force is exerted on the catch element 60 via the Bowden pull wire, then this catch element is blocked in the set position by means of the coupling 56.

For example, if the above Bowden pull wire is connected to a mobile part of a lordosis support then the lordosis support can be adjusted randomly by means of the above adjusting mechanism and is locked automatically in position when the adjusting mechanism is not used.

Figure 4:
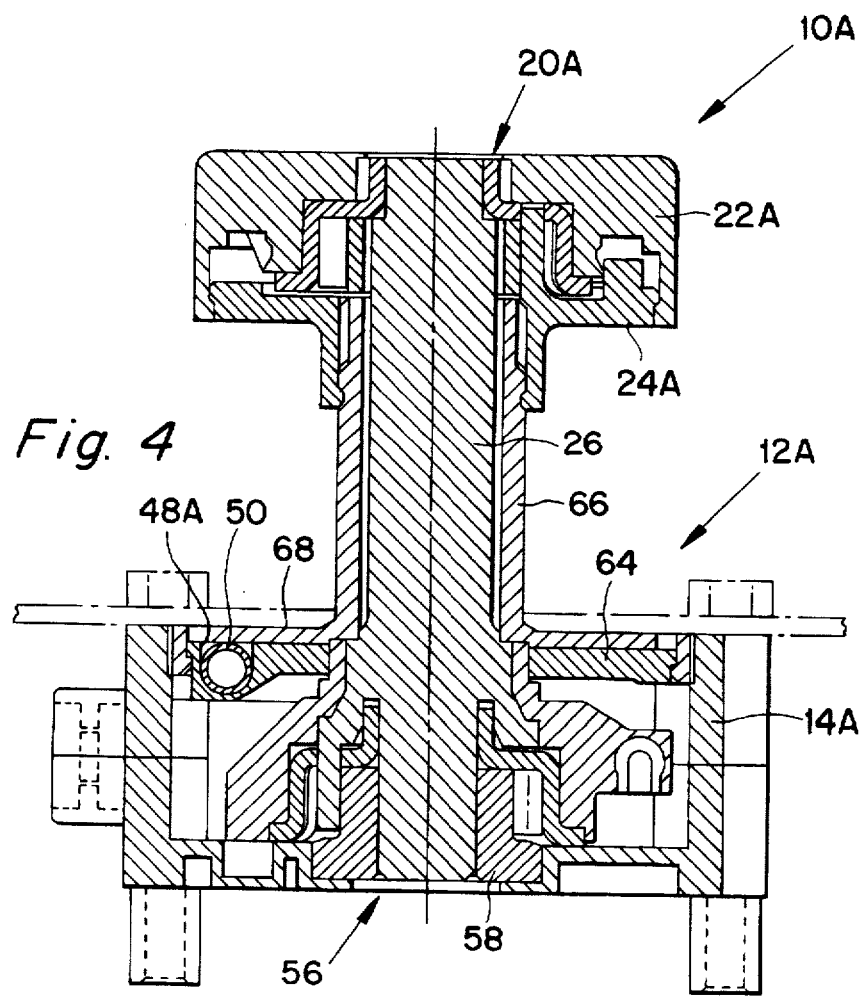
FIG. 4 shows a longitudinal section through an adjusting mechanism in accordance with another exemplary embodiment.

FIG. 4 shows a somewhat different exemplary embodiment in which the readjusting device is located in the housing 14A of the driving unit 12A so that the support 16 shown in FIG. 1 is no longer necessary. In this case the stationary part which accommodates the spring 50, is comprised of a cover 64 of the housing 14A which is somewhat offset to the inside. Instead of the pipe-shaped extension 18 of the housing in FIG. 1 this design has a sleeve shaft 66 with the release element 24A latched onto its free end and it being torsionally wedged with the release element. The sleeve shaft 66 has a flange 68 at its lower end which is latched with the cover 64 and which can be rotated relative to the cover 68 within a limited range. This flange 68 has the pins 52 (not shown in FIG. 4) which act together with the spring 50.

An option is to integrate the coupling 20A with the housing 14A so that only a connection piece comes out of the housing 14A which is connected with the catch element of this coupling and which provides the actuating device and has a lever which corresponds to lever 46, for example.

Figure 5:
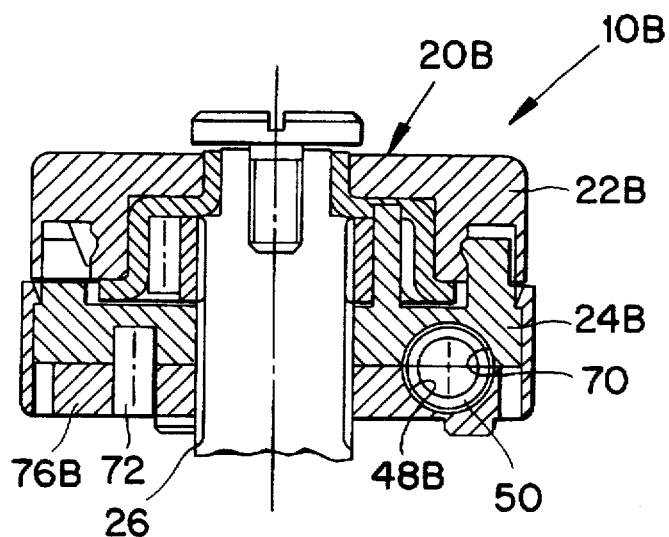
FIG. 5 shows a partial longitudinal section through and adjusting mechanism in accordance with another exemplary embodiment.
Figure 6:
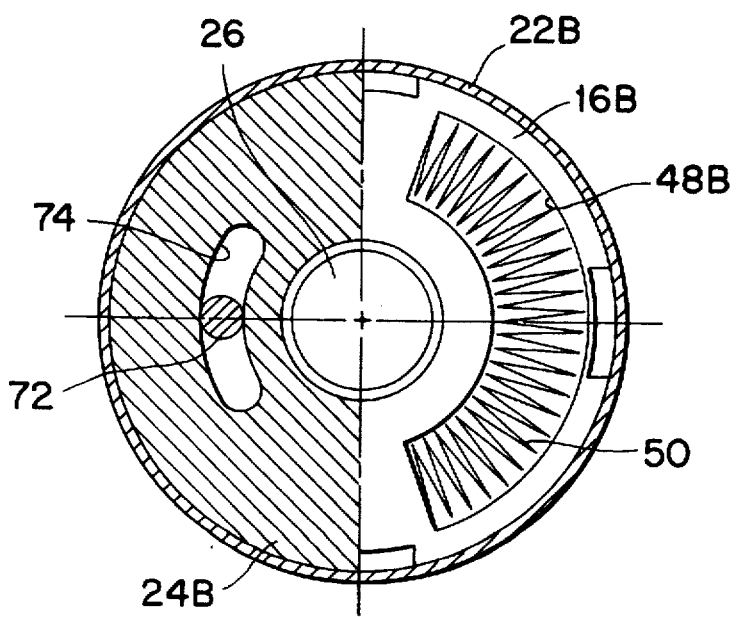
FIG. 6 shows a horizontal section through the adjusting mechanism in accordance with FIG. 5.

FIGS. 5 and 6 show a modified exemplary embodiment of the readjusting device. The curved groove 48B in the support 16B here only has a semi-circular cross-section; a complementary groove 70 can be found in the release element 24B. These two grooves 48B and 70 have the same length in the circumferential direction and together form a curved chamber which accommodates the spring 50. When the release element 24B is in the starting position then each end of the spring 50 rests against the floor of the groove 70 as well as the floor of the groove 48B. If, however, the release element 24B is rotated out of its starting position then the spring 50 only rests against the floor of the groove 70 of this release element and the other end only rests against the floor of the groove 48B of the support 16B so that the spring is compressed.

In order to limit the swivelling range of the release element 24B and thus that of the actuating device 22B, the support 16B in the example has a protruding pin 72 which is engaged in the curved groove 74 of the release element 24B. Of course, it is possible to have the order of the pin and the groove reversed. Another option is to limit the swivelling range by compressing the spring 50 on a block.

While in the above examples the actuating device, the release element and the adjusting device are rotating parts it is possible to make these components so that they are linear, mobile elements. In that case, the coupling 20 would be a linear coupling wherein the ring 30 and the interacting parts are substituted by their respective layout.

The adjusting mechanism in accordance with the invention can also have a gear at its input or output side. For example, it is possible for the housing 14 in FIG. 1 to accommodate a planet gear, a spur gear or a belt pinion gear or a similar gear whose input element is comprised of the shaft 26 or even by the catch element 60 of the coupling 56. This gear can be coaxial to the shaft 26 or lateral to the shaft.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An adjusting mechanism for adjusting an adjustably movable member, comprising:
   an adjusting element adapted to be connected to the adjustably movable member for producing an adjustment thereof; and
   a coupling operably connected to the adjusting element for moving the adjusting element, the coupling including:
   an actuating element arranged for movement in first and second opposite directions in response to the application thereto of an actuating force external to the coupling;
   a release element operably connected to the actuating element for movement therewith in the first and second directions;
   an elastic return element operably connected to the release element for storing energy in response to the release element being driven in either of the first and second directions by the actuating element when acted upon by an actuating force, and for applying the stored energy as a restoring force to the release element for causing the release element to be driven and drive the actuating element in a return direction; and
   a connecting mechanism operably connecting the coupling to the adjusting element for driving the adjusting element when the actuating element and release element are driven by the actuating force, and for releasing the coupling from the adjusting element when the actuating element and release element are driven in a return direction by the restoring force.

2. The adjusting mechanism according to claim 1, wherein the actuating element and release element are arranged to have limited relative play in each of the first and second directions.

3. The adjusting mechanism according to claim 1, wherein the actuating element includes a manually actuable handle for applying a manual force as the external force.

4. The adjusting mechanism according to claim 1, wherein the first and second directions of movement constitute rotational directions about an axis of rotation.

5. The adjusting mechanism according to claim 4, wherein the actuating and release elements are both rotatable about the axis of rotation in the first and second directions, the adjusting element comprising a shaft rotatable about the axis of rotation.

6. The adjusting mechanism according to claim 1, wherein the connecting mechanism comprises a plurality of pairs of pinch rolls situated in a gap between the actuating element and the adjusting element, an elastic spacer disposed between the pinch rolls of each pair, portions of the release element situated between respective ones of the pairs of pinch rolls, the gap including a wedge-shaped portion for pressing the pinch rolls into force transmitting relationship with the actuating element and the adjusting element when the actuating and release elements are driven by the actuating force.

7. The adjusting mechanism according to claim 1, further including a stationary element, the elastic return element comprising a coil spring mounted in the stationary element and arranged to be compressed between the stationary element and a portion of the release element.

8. The adjusting mechanism according to claim 7, wherein the actuating and release elements are both rotatable about a common axis of rotation in the first and second directions, the coil spring being situated in a curved groove of the stationary element, the groove being concentric with the common axis.

9. The adjusting mechanism according to claim 8, wherein the opposite ends of the groove form abutments against which the coil spring abuts, the portion of the release element comprising a pair of pegs each arranged to compress the coil spring against a respective one of the abutments in response to rotation of the actuating element.

10. The adjusting mechanism according to claim 9, wherein the groove includes extended portions extending past respective ones of the abutments, the pegs being movably disposed in respective ones of the extensions.

11. The adjusting mechanism according to claim 8, wherein the release element includes a curved groove superimposed over the groove of the stationary element, the coil spring disposed in both grooves.

12. The adjusting mechanism according to claim 1 further including a catch element connected to the adjustable member and to the adjusting element to be driven thereby, and an additional connecting mechanism connecting the catch element to a stationary brake element when a force is applied from the adjustable member to the catch element tending to move the latter.

13. The adjusting mechanism according to claim 12, wherein the catch element includes a receptacle for receiving a cable for connection with the adjustable member.

14. The adjusting mechanism according to claim 1, wherein the adjusting element is connected directly to a gear for adjusting the adjustable member.

* * * * *